April 2, 1935.  R. P. NORTON  1,996,118
VALVE RESEATING TOOL

Filed June 30, 1933

Inventor
Raymond P. Norton
by Orwig & Hague Attys.

Patented Apr. 2, 1935

1,996,118

UNITED STATES PATENT OFFICE 1,996,118

VALVE RESEATING TOOL

Raymond P. Norton, Algona, Iowa

Application June 30, 1933, Serial No. 678,372

1 Claim. (Cl. 90—12.5)

The object of my invention is to provide a valve reseating tool of simple, durable and inexpensive construction.

More specifically it is my object to provide a tool of this character which may be readily, quickly and easily placed in position within a valve, and which will automatically provide an accurately centered bearing for the tool cutter shaft regardless of whether or not the shaft of the tool cutter accurately fits the stem opening of the valve, and regardless of the relative distance between the valve seat and the valve bonnet, and to provide a tool of this character in which an unskilled person can quickly and easily cut a perfect valve surface upon a previously worn valve seat.

Figure 2:
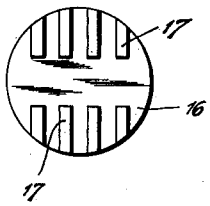
Figure 1:
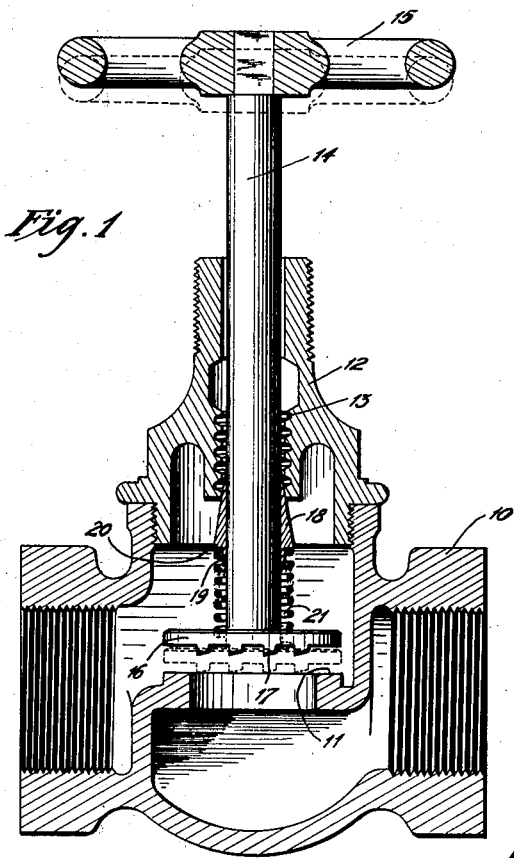

My invention consists in the construction, arrangement and combination of the various parts of the device, whereby the objects contemplated are attained, as hereinafter more fully set forth, pointed out in my claim, and illustrated in the accompanying drawing, in which:

Figure 1 shows a vertical, central, sectional view through a valve body and bonnet with my improved valve reseating tool shown in position therein ready for use. The dotted lines show the position of the valve cutter when moved downwardly within the valve body; and Figure 2 shows a face view of the valve cutter.

Referring to the accompanying drawing, I have used the reference numeral 10 to indicate generally a valve body having a valve seat 11. The valve bonnet is indicated generally by the numeral 12, and is provided with a valve stem opening, the lower portion of which is screw-threaded at 13.

The parts just described are of the ordinary construction and are simply illustrated and described to show the manner in which my improved valve reseating tool is assembled therewith and used.

My improved valve reseating tool comprises a stem 14 having a detachable handle 15 at its upper end. Fixed to its lower end is a cutting tool 16, preferably circular in outline and provided on its cutting face with a series of cutters 17 of ordinary construction.

Slidingly mounted upon the valve stem is a stem centering cone indicated generally by the reference numeral 18 and formed with a cylindrical central opening shaped to form a relatively tight sliding and rotatable fit with the stem 14. At its lower end is a downwardly extended sleeve 19 and a shoulder 20 is formed above the sleeve. The outer surface of the centering cone is tapered from its lower end toward its upper end and is shaped to enter the screw threaded portion 13 of the valve bonnet 12.

Mounted upon the lower end of the valve stem is an expansible coil spring 21, and its lower end is in engagement with the cutter 16 and its upper end in engagement with the shoulder 20, and is held spaced apart from the stem 14 by the sleeve 19.

In practical operation, and assuming that a valve seat has been worn, the operator first removes the valve bonnet and then removes the valve stem from the bonnet. He then removes the handle 15 from the stem 14 of the valve reseating tool and projects it through the central opening of the bonnet from the under side. He then replaces the handle 15 and screws the bonnet into the valve body to its normal position. When this has been done, the centering cone 18 has been automatically forced up into the screw threaded opening of the bonnet to position for centering the stem 14 accurately within the stem opening of the bonnet, and the cylindrical interior surface of the centering cone furnishes a bearing in which the stem 14 may be moved vertically or rotated and properly guided during such movements. Then the operator turns the handle 15 and brings the cutter into working contact with the valve seat and by rotating the same, the valve is reseated in an ordinary way.

During the process of reseating the valve, the spring 21 serves to apply a certain amount of pressure downwardly to the valve cutting tool, and this may be augmented if desired by downward pressure of the operator's hand.

During this reseating movement, the stem of the cutting tool is so accurately held in position by the centering cone that it will not chatter or move laterally during the cutting operation, and when the cutting operation has been completed, the bonnet is first removed, then the tool is removed from the bonnet and the bonnet replaced in the ordinary way.

It sometimes happens that the distance between the bottom of the bonnet of a valve and the seat varies in valves of different makes. It also sometimes happens that the diameter of the valve stem opening varies.

With my improved device neither of these things makes any difference whatever in the actual operation, for the spring 21 serves to move the cutting tool downwardly into engagement with the valve through any ordinary range of varied positions of the valve seat with relation to the interior of the valve body, and furthermore, if the opening in the valve stem is of relatively large diameter, the centering cone will simply move upwardly farther than will be the case if it is of relatively small diameter, but the operator need pay no attention to any of these matters because my improved device automatically centers itself and adjusts itself regardless of such difference in construction of the valve body and bonnet.

I claim as my invention:

A valve reseating tool for use in connection with a valve having a detachable bonnet formed with a screw threaded opening for a valve stem, said tool comprising a stem shaped to pass through and be freely movable longitudinally and rotatably in the screw threaded opening of a valve bonnet a reseating cutter fixed to the lower end of said stem, a cone shaped centering device slidingly and rotatably mounted on the said stem with its smaller end at the top and shaped to enter and engage the lower portion of a screw threaded opening in a valve bonnet, and a spring interposed between the centering cone and the reseating cutter for exerting an upper pressure upon the centering cone, said parts being so arranged and constructed as to permit up and down movement of the cutter during a reseating operation and hold the cone in centering position relative to the opening in the bonnet during such up and down movement of the cutter and apply a yielding pressure for holding the cutter against a valve seat.

RAYMOND P. NORTON.